United States Patent [19]
Zamiara

[11] 3,844,135
[45] Oct. 29, 1974

[54] COOLING SYSTEM FOR SAUSAGES
[75] Inventor: Anthony W. Zamiara, Spencerport, N.Y.
[73] Assignee: Maplecrest Sausage Co., Inc., Rochester, N.Y.
[22] Filed: Mar. 22, 1973
[21] Appl. No.: 344,059

[52] U.S. Cl. .............................................. 62/375
[51] Int. Cl. ............................................. F25d 7/02
[58] Field of Search .......... 62/63, 64, 375; 239/193; 137/262, 561 A

[56] References Cited
UNITED STATES PATENTS
| | | | |
|---|---|---|---|
| 1,550,946 | 8/1925 | Braungart, Jr. et al. | 62/375 |
| 2,080,103 | 5/1937 | Zarotschenzeff | 62/64 X |
| 3,147,212 | 9/1964 | Van Koppen et al. | 239/193 |
| 3,158,171 | 11/1964 | Eckert | 239/193 X |

Primary Examiner—Meyer Perlin
Assistant Examiner—Ronald C. Capossela
Attorney, Agent, or Firm—Martin P. Hoffman

[57] ABSTRACT

A cooling system for rapidly chilling cooked skinless sausages to a temperature at which such products can easily be peeled by automated mechanical peelers, such system including a cooling tunnel, a refrigeration unit therefor, a closed loop recirculation assembly with unique spray means operatively associated with the cooling tunnel and refrigeration unit, a pump for forcing a cold brine solution through the recirculation assembly, motor driven conveyors for advancing rods with sausages depending therefrom through the cooling tunnel, and variable speed transmission means for adjusting the rate of advance of the sausages through the tunnel. The spray means includes an elongated pipe near the top of the cooling tunnel with a plurality of longitudinally spaced outlets that discharge the brine solution into receptacles positioned below the outlets on a wire-mesh barrier. When the receptacles are filled to capacity, the excess solution overflows and passes downwardly through the barrier, which produces a fine mist-like spray or shower of minute droplets. The droplets, after cooling the sausages passing through the tunnel, are collected in a reservoir at the bottom of the tunnel and then pumped upwardly into the inlet end of the elongated pipe.

3 Claims, 4 Drawing Figures

COOLING SYSTEM FOR SAUSAGES

BACKGROUND OF THE INVENTION

1. Field of the Invention

The invention relates generally to cooling systems for rapidly chilling skinless sausages and like products, and more particularly to cooling systems for chilling food products by a fine mist of chilled fluid as the products are advanced at variable speed through a cooling tunnel.

2. Description of the Prior Art

One widely used type of conventional cooling system for rapidly chilling foodstuffs employs a cooling tunnel, a fixed speed conveyor for advancing the foodstuffs therethrough, and an elongated, longitudinally extending pipe with a plurality of spaced spray nozzles. As the foodstuff is moved through the cooling tunnel, the pipe is filled with a brine solution that is sprayed over the foodstuff to chill same. Representative prior art systems are shown in U.S. Pat. Nos. 1,894,813 and 2,080,103, granted to Mikail Zarotschanzeff, and in U.S. Pat. No. 2,329,226, granted to Stafford et al.

Another widely used type of conventional cooling system for rapidly chilling foodstuffs employs a long deep tank adapted to be filled with refrigerated water, brine or some other cooling medium. The foodstuffs are draped over a horizontally extending rod that bridges the open upper end of the tank, and the foodstuffs hang downwardly into the tank. A fixed speed chain conveyor advances the rod along the length of the tank so that the foodstuffs are moved through the refrigerated water from the head to the discharge end of the apparatus. A representative system of this type is shown in U.S. Pat. No. 3,482,417, granted to Davis et al.

While the conventional cooling systems noted above performed satisfactorily under most operating conditions, such systems did not prove to be efficient enough over a range of temperatures to be compatible with recently developed, automated foodstuff processing machines, such as sausage peelers. In the known spray-type cooling systems, problems were encountered with the clogging of the minute spray orifices and in circulating the cooling solution between the closely-packed sausages held on the rods than span the lateral dimension of the tunnel. The difficulties of keeping the cooling solution finely dispersed and in constant circulation for maximum effectiveness, and in achieving efficient operation at different temperatures for different batches of products, were compounded when the cooling system was utilized in-line with automated sausage peelers which operate most efficiently at a predetermined temperature, such as 35°F.

SUMMARY

Thus, with the shortcomings of conventional cooling systems for foodstuffs, such as sausages and like products, clearly in mind, the instant invention contemplates a cooling system that relies upon a mist-like dispersion of brine by means of a plurality of receptacles spaced above a wire-mesh barrier, with the overflow from the receptacles being broken up into fine droplets that fall downwardly into the interior of a cooling tunnel. The droplets effectively cool the several closely spaced sausage links depending from each one of a series of rods that laterally span the cooling tunnel.

The invention further contemplates a cooling system utilizing a variable speed drive for controlling the speed at which power driven chain conveyors advance the rods carrying the sausages or like products to be chilled. Such variable speed drive can be regulated to adjust the length of time that elapses as the sausages traverse the length of the tunnel and thus the temperature to which the cooked sausages are chilled prior to entering an automated peeling machine. Additionally, the instant invention contemplates an automated versatile and sanitary cooling system of simplified configuration, but with the capability of high volume performance. In actual usage, the instant cooling system has the capability of producing 4,000 pounds of chilled foodstuff per hour with a cooling tunnel of small dimensions, such as 4½ feet by 5½ feet in cross-section and 10 feet in length.

Additional advantages attributable to the instant invention will become apparent from the following description of the invention when construed in harmony with the drawings depicting such invention.

DESCRIPTION OF THE PREFERRED EMBODIMENT

Figure 1:
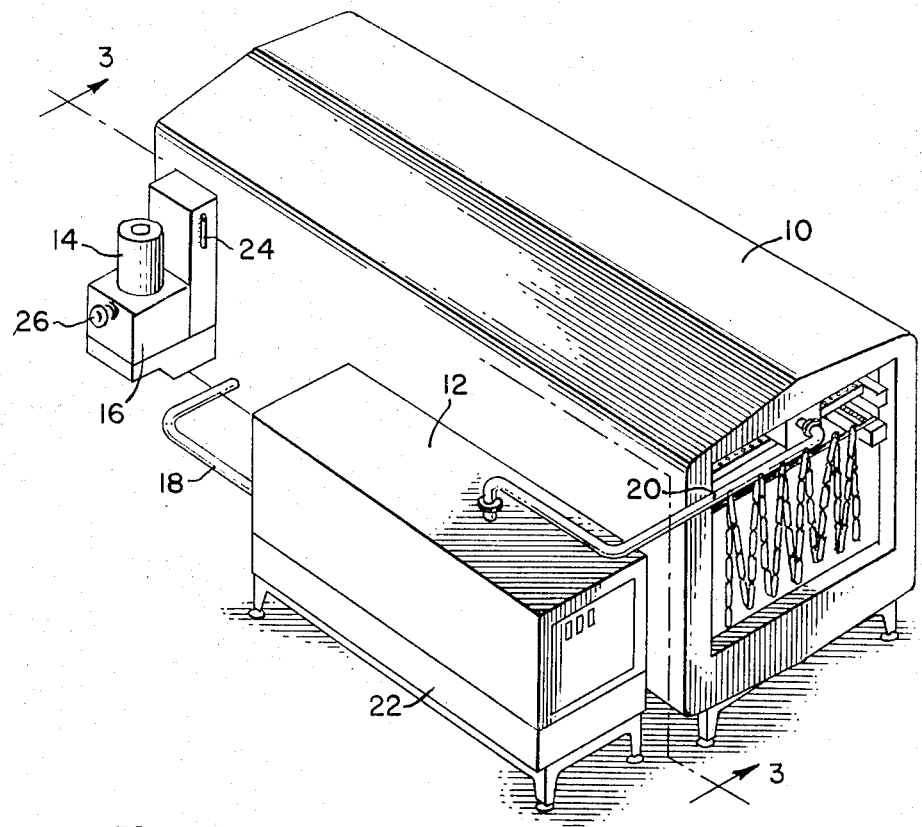
FIG. 1 is a perspective view of a cooling system embodying the principles of the instant invention, such system including, inter alia, a cooling tunnel, a refrigeration unit, a pump for forcing a chilled fluid into and through the tunnel, and a motor for driving the components of such system.

Referring now to the drawings, FIG. 1 shows the cooling system constructed in accordance with the principles of the instant invention, such system comprising a cooling tunnel 10, a refrigeration unit 12, a pump 14, a motor 16 for driving the pump, and a closed-loop recirculation assembly including conduits 18 and 20 which interconnect the cooling tunnel and the refrigeration unit. Tunnel 10 is constructed of stainless steel, and is designed for easy cleaning and sterilization. Refrigeration unit 12 is of conventional design, and a heat exchanger 22 contained therein takes the fluid entering the rear of the housing through inlet conduit 18 and chills same before it is forced by pump 16 to exit through outlet conduit 20. The fluid utilized will be a brine solution which is compatible with the sausages or like product being chilled. A thermometer 24 indicates the temperature maintained within tunnel 10, and a control knob 26 adjusts the desired setting for a variable speed transmission (not shown) that is operatively associated with motor 16.

Figure 2:
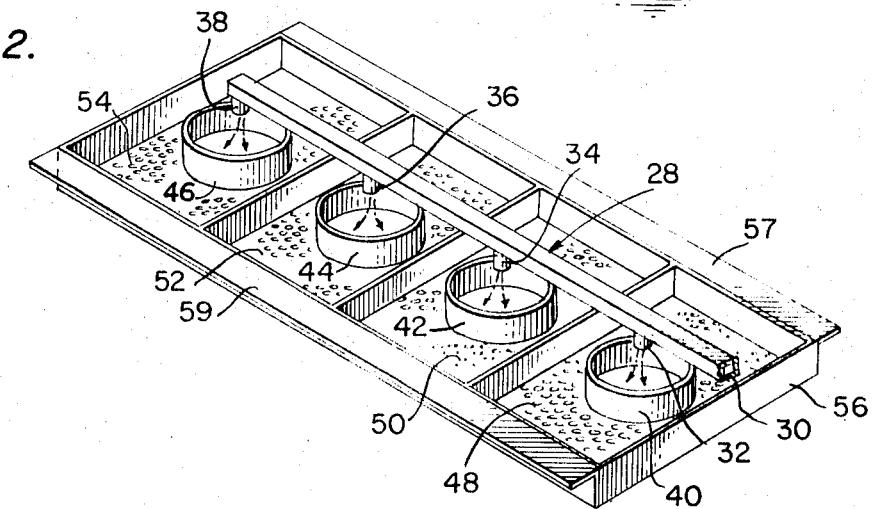
FIG. 2 is a perspective view, on an enlarged scale, of the unique assembly for dispersing the chilled fluid within the cooling tunnel.

FIG. 2 depicts the assembly for effectively dispersing the brine solution within cooling tunnel 10 in a fine mist or shower. Such assembly, which is indicated generally by reference numeral 28, forms an integral part of the recirculation system and is disposed near the top surfaces of the interior of the tunnel. Assembly 28 includes an elongated pipe 30 having a plurality of spaced outlets 32, 34, 36 and 38. The outlets are located in vertical alignment with a like number of upwardly opening receptacles 40, 42, 44 and 46, which rest upon a like plurality of wire-mesh barriers 48, 50, 52 and 54. The barriers are seated within a rigid rectangular frame 56 and lips 57, 59 are formed at opposite sides of the frame to facilitate seating same. The upstream end of pipe 30 is connected to conduit 20 at the forward end of tunnel 10.

Figure 3:
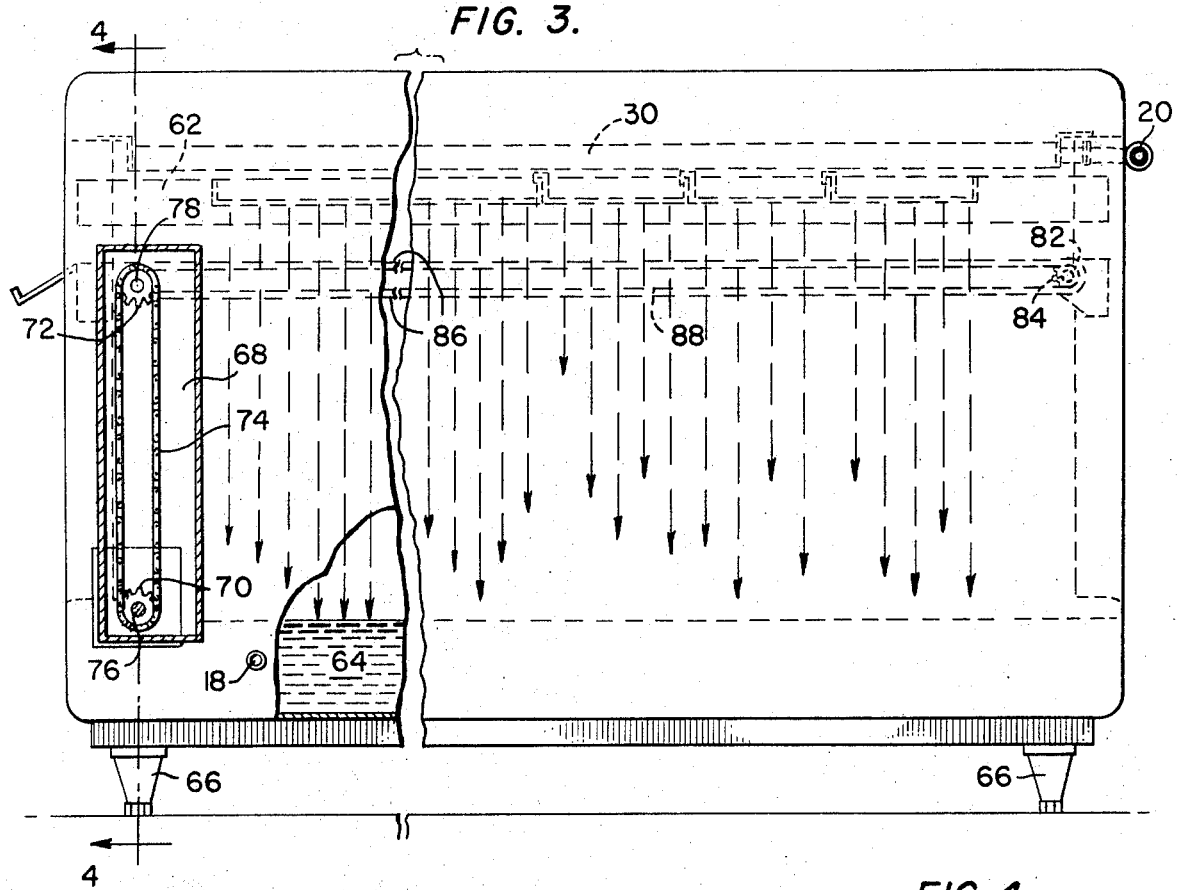
FIG. 3 is a side elevational view of the cooling tunnel of FIG. 1, with sections broken away for illustrative purposes, such view being taken on line 3—3 in FIG. 1 and in the direction indicated.

FIG. 3 reveals the details of the interior of cooling tunnel 10; for example, the manner in which assembly 28 is seated upon channels 60, 62 to extend longitudinally through tunnel 10 is visible. The dotted lines within the interior of the tunnel indicate the downward path of the fine mist that continually contacts the food products as they are advanced therethrough.

The fine mist of brine is collected in a reservoir 64 defined at the bottom of the tunnel, and the reservoir communicates with refrigeration unit 12 via conduit 18. The brine flows through refrigeration unit 12 wherein the heat exchange 22 lowers its temperature. The chilled brine solution is then forced, under the pressure supplied by pump 14, into conduit 20 which communicates with the elongated pipe 30 extending longitudinally through tunnel 10. It will be noted that the brine solution is employed in a closed-loop recirculation system with attendant operational economies. Legs 66 at the corners of tunnel support same at a convenient height so that the foodstuffs can be readily introduced into, and removed, from the tunnel.

Figure 4:
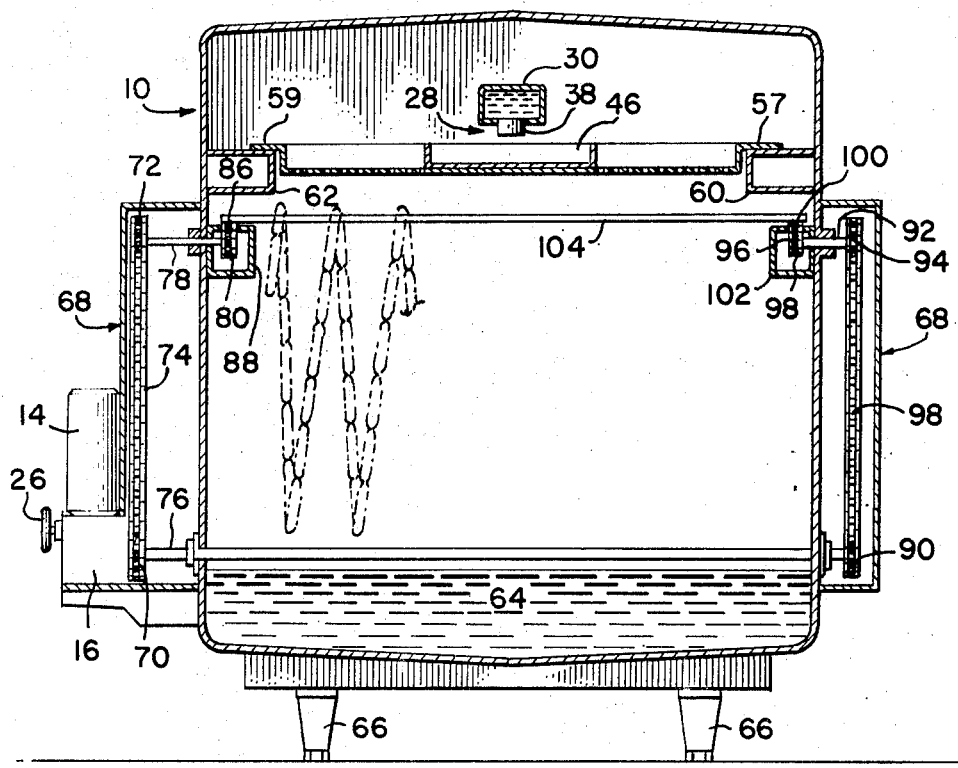
FIG. 4 is a vertical cross-sectional view of the cooling tunnel, such view being taken along line 4—4 in FIG. 3 and in the direction indicated.

As shown in FIGS. 1, 3 and 4, a variable speed transmission, controlled by the manual adjustment of knob 26, is situated at the exterior left rear corner of tunnel 10 in a housing adjacent to motor 16. The transmission may be a "Boston" variable speed transmission of conventional design, and may be equipped with a safety clutch of conventional design on its output shaft. Such transmission, which is driven by motor 16, supplies power to the parallel drive chain system, indicated generally by reference numeral 68, that advances rods carrying sausages through tunnel 10. Part of drive chain system 68 is situated in a suitable housing at one side of tunnel 10, and the remainder of such system is situated in a similar housing at the opposite side of tunnel 10, as seen in FIG. 4.

Chain system 68 includes a first or input gear 70 and a second or output gear 72 with a drive chain 74 trained over both gears. Input gear 70 is rigidly secured to shaft 76, which is indirectly driven by motor 16 through the variable speed transmission. Output gear 72 is rigidly secured to stub shaft 78, and another gear 80 is secured to the inboard end of shaft 78, as shown in FIG. 4. A gear 82 is rigidly secured to a shaft 84 at the front end of tunnel 10, and a horizontally extending drive chain 86 is trained over gears 80 and 82, as shown in FIG. 3. The upper run of chain 86 extends through a longitudinally extending slot in channel 88, which channel protects the chain against the deleterious influence of the brine mist. Belt tensioners of conventional design may be employed to maintain the desired tautness throughout the chain system.

Returning again to FIG. 4, it will be seen that shaft 76 laterally spans tunnel 10 at an elevation slightly above the upper reach of reservoir 64. A gear 90 is secured to the end of shaft 76 remote from gear 70, and is driven at the same rate of speed as gear 70. A second stub shaft 92 with gears 94 and 96 rigidly secured to opposite ends thereof is situated in alignment with stub shaft 78. A drive chain 98 is trained over gears 90 and 94 to deliver power to longitudinally extending drive chain 100. The drive chain is protected from the brine spray by channel 102. From the foregoing description, it will be appreciated that parallel drive chains 86 and 100 are advanced in tandem at a rate determined by the manual setting of control knob 26 of the variable speed transmission.

SUMMARY OF OPERATIONS

Although it is believed that a complete understanding of the cycle of operation for the instant invention could be gleaned from the foregoing description, a recapitulation of the operation of the system may be helpful. The operator turns on motor 16 to drive pump 14 and adjusts the setting of control knob 26 for the variable speed transmission which advances tandem chains 86 and 100, then he places a rod 104 atop the pair of chains at the open entrance end of tunnel 10. The rod is selected to be of the proper size to span the lateral distance between the chains. A multiplicity of cooked sausage links are then strung in chain-like fashion over rod 104 so that the sausages depend downwardly, as indicated in FIGS. 1–4. The links are tightly packed, and several rods are closely placed upon the chains in rapid succession to take full advantage of the high capacity superior chilling ability of the fine mist dispersed by the chilling assembly 28, as shown in FIG. 2. The rate of advance of the rods through the cooling tunnel is correlated with the temperature observed on thermometer 24, for the sausages must exit from the tunnel at a precise temperature, such as 35°F., that is compatible with the automated sausage peeling equipment now in widespread usage.

While a preferred embodiment of the invention has been shown and described in detail, it will, of course, be understood that various modifications, alterations, adjustments, and changes, will occur to the artisan without departing from the scope of this invention. Accordingly, it is requested that the appended claims be broadly construed in a fashion commensurate with the advance in the useful arts and sciences to which this invention appertains.

What is claimed is:

1. A cooling system for chilling sausages comprising a. a cooling tunnel with an inlet port and an outlet port, a reservoir formed within said tunnel,
   b. a refrigeration unit including a heat exchanger, an inlet conduit connected between one side of said heat exchanger and the inlet port of said tunnel, and an outlet conduit connected between the other side of said heat exchanger and the outlet port of said tunnel,
   c. a cooling solution,
   d. pump means for forcing said cooling solution collected within said reservoir to circulate through said cooling tunnel and said refrigeration unit,
   e. chain means extending longitudinally through said cooling tunnel, said chain means being adapted to advance sausages through the tunnel,
   f. motor means to drive said pump means and said chain means, g. spray means disposed within said cooling tunnel with the inlet for said spray means being connected to the inlet port of said cooling tunnel, h. said spray means comprising an elongated pipe that extends longitudinally through said tunnel near the top thereof a plurality of outlets spaced along said pipe, the invention being characterized by a barrier formed of wire-like mesh located beneath said pipe and extending longitudinally through said tunnel, and a plurality of upwardly opening receptacles positioned atop said barrier in alignment with said outlets of said pipe, whereby the cooling solution forced through the pipe by said pump means exits through said plurality of outlets, fills said receptacles, and then spills over said receptacles and passes through said wire-like mesh barrier to form a fine mist of minute droplets within the cooling chamber which contact the sausages to chill same.

2. A cooling system as defined in claim 1 wherein said spray means is further characterized by a rigid frame having horizontally extending lips at the opposite side of said frame for supporting said barrier, and a pair of channels extending longitudinally through said tunnel, the lips of said barrier being positioned on said channels to retain said barrier at a fixed position spaced below said elongated pipe.

3. A cooling system as defined in claim 1 wherein a variable speed transmission interconnects said motor means and said chain means so that said chain means can be advanced at a variable speed, said chain means comprising a pair of parallel chains spaced on opposite interior sides of the cooling tunnel, said variable speed transmission including a first and second gear at one side of the cooling tunnel, said first gear being driven by said motor means at a rate altered by a manual control element, a first drive chain interconnecting said first and second gears, a third and fourth gear at the opposite side of the cooling tunnel, a second drive chain interconnecting said third and fourth gears, and a shaft extending laterally across said cooling tunnel to interconnect said first and third gears.

* * * * *